United States Patent
Ra

[19]

[11] Patent Number: 6,079,854
[45] Date of Patent: Jun. 27, 2000

[54] DEVICE AND METHOD FOR DIFFUSING LIGHT

[76] Inventor: Dojin Ra, 101 E. Edsall Ave., #C5, Palisades Park, N.J. 07650

[21] Appl. No.: 09/023,528

[22] Filed: Feb. 13, 1998

[51] Int. Cl.[7] .................................................. F21V 8/00
[52] U.S. Cl. .................... 362/342; 362/342; 362/301; 362/346; 362/297; 362/351; 362/362; 362/355; 362/356; 362/360; 362/329; 362/328; 362/308; 362/309; 362/551; 362/552; 362/554
[58] Field of Search ..................... 362/342, 301, 362/346, 297, 351, 362, 355, 356, 360, 329, 328, 308, 309, 551, 552, 554

[56] References Cited

U.S. PATENT DOCUMENTS

| | | |
|---|---|---|
| 3,526,764 | 9/1970 | Klie et al. . |
| 3,710,093 | 1/1973 | Riehl et al. . |
| 3,731,079 | 5/1973 | Porsche . |
| 3,735,114 | 5/1973 | Porsche . |
| 4,112,483 | 9/1978 | Small, Jr. et al. ...................... 362/301 |
| 4,142,229 | 2/1979 | Hulbert, Jr. . |
| 4,191,990 | 3/1980 | Beeftink et al. . |
| 4,458,303 | 7/1984 | Berns . |
| 4,482,939 | 11/1984 | Tishman . |
| 4,559,589 | 12/1985 | Sassmannshausen . |
| 4,644,448 | 2/1987 | Heiler . |
| 4,743,082 | 5/1988 | Mori ....................................... 350/69.1 |
| 4,891,559 | 1/1990 | Matsumoto et al. . |
| 5,032,955 | 7/1991 | Jurgens . |
| 5,113,321 | 5/1992 | Suzuki ................................... 362/301 |
| 5,122,940 | 6/1992 | Wiegand ................................ 362/342 |
| 5,191,264 | 3/1993 | Hammond . |
| 5,810,469 | 9/1998 | Weinreich ............................. 362/342 |

*Primary Examiner*—Sandra O'Shea
*Assistant Examiner*—Bertrand Zeade
*Attorney, Agent, or Firm*—Weingram & Associates, P.C.

[57] ABSTRACT

A device is provided to diffuse a beam of light, the device consisting of a plurality of truncated cells nested together along their respective sidewalls for collecting and diffusing the light rays as they extend along the plurality of cells having an expansive, tapered interior volume. The device diffuses the main light beam in a headlamp, for example, thereby substantially reducing the glare experienced by oncoming drivers and permitting high beams of the headlamp to be used in the presence of the oncoming drivers. The device of the present invention is retrofitable to existing headlamps. In another embodiment of the present invention, a concave lens is disposed in the headlamp assembly to diffuse the main light beam prior to it entering the truncated cells, while each one of the cells of the dispersion device is also provided with its own respective concave lens to augment the diffusing effect.

27 Claims, 3 Drawing Sheets

DEVICE AND METHOD FOR DIFFUSING LIGHT

BACKGROUND OF THE INVENTION

1. Field of the Invention

The present invention relates to automobile lighting fixtures and methods for directing and diffusing light emitted from the fixtures.

2. Discussion of the Related Art

Automobile headlights and methods for controlling and shaping a light beam are disclosed in the following patents:

| U.S. Pat. No. | Inventor(s) |
| --- | --- |
| 3,526,764 | Klie et al |
| 3,710,093 | Riehl et al |
| 3,731,079 | Porsche |
| 3,735,114 | Porsche |
| 4,142,229 | Hulbert, Jr. |
| 4,191,990 | Beeftink et al |
| 4,458,303 | Berns |
| 4,482,939 | Tishman |
| 4,559,589 | Sassmannshausen |
| 4,644,448 | Heiler |
| 4,891,559 | Matsumoto et al |
| 5,032,955 | Jurgens |
| 5,191,264 | Hammond |

U.S. Pat. No. 3,526,764 to Klie et al discloses a retractable motor headlight arrangement consisting of a lens having a prism profiled surface for directing light beams from the vehicle headlight in the direction of travel, i.e. for bending the light beams toward the direction of travel.

U.S. Pat. No. 4,142,229 to Hulbert, Jr. discloses a method of shaping a light beam wherein a sealed beam lamp lens cover is composed of a number of different optical light control elements, such as prisms or cylindrical lenses, areas of which are systematically covered so that maximum candela requirements are not exceeded.

U.S. Pat. No. 4,458,303 to Berns discloses a light beam concentrating, intensifying and filtering device, wherein a parallel ray light source of the parabolic reflector type is employed in association with a leaf shutter, not unlike that used in conventional cameras, to vary the beam of light.

U.S. Pat. No. 4,559,589 to Sassmannshausen discloses a lighting fixture with a concave reflector such as a tail light, warning or signal light, etc., wherein a reflector for the light is provided with slits through which light passes to contact a prism for scattering the light.

U.S. Pat. No. 5,032,955 to Jurgens discloses a mud flap mounted vehicle reference lighting system wherein a plurality of lamps are mounted to a parabolic reflector for coaction with a louver to effectively position the light pattern at a desirable location observable to the driver.

The remaining patents to Riehl, Porsche, Beeftink, Tishman, Heiler, Matsumoto, and Hammond disclose apparatus and systems which relate generally to the present invention and are directed toward manipulating the headlamp assembly with respect to the road and other vehicles in the area.

The known devices include intricate and complex structures which are not retrofitable to existing light fixtures without substantial structural modification of the fixture. Certain of the devices, such as that disclosed in Hulbert, Jr., teach to cover or coat portions of the lens cover of the device to reduce candela and glare.

In addition, the lighting fixtures discussed above rely substantially on flutes, prisms and lenses only to direct the light from the luminous element, which results in erratic, uncontrolled scattering of the light, not necessarily in the desired direction.

Among the patents above, the devices and methods disclosed do not include a structure mountable within a housing for the light fixture, which structure consists of a plurality of truncated hollow cells ganged together to diffuse the light emitted from a luminous body for the light fixture. The device of the present invention also provides for controlled diffusion of the light beam.

The present invention also provides for structure which permits increased candela for the light beam without the detrimental side effect of increased glare associated with the known light fixture devices. Therefore, the diffusion of the light beam emitted from the present invention will be compensated for by the device permitting an increase in the maximum candela emitted by the luminous body of the light fixture.

OBJECTS AND SUMMARY OF THE INVENTION

It is an object of the present invention to provide a device and method for directing a light beam, and more particularly, to diffuse a light beam emitted from an automobile headlight.

It is another object of the present invention to provide a device which permits use of a luminous body having increased candela without a corresponding amount of glare.

It is another object of the present invention to provide a diffusing element which substantially reduces, if not eliminates, the blinding glare from headlamps experienced by oncoming drivers, regardless of whether the headlight fixture is in low or high beam mode.

It is another object of the present invention to provide a light beam diffuser which provides an increased zone of coverage by the light beam, whether in the low beam or high beam mode.

It is another object of the present invention to provide a lighting fixture for an automobile wherein the fixture includes a plurality of luminous bodies, each one of which operatively coacts with a corresponding cell of the diffuser device for diffusing light emitted from the illuminating bodies.

It is another object of the present invention to provide a light diffuser device consisting of a plurality of cells which when ganged together coact to provide a synergistic effect for diffusing light emitted from a luminous body.

It is another object of the present invention to provide a head lamp housing consisting of a light diffuser device of the present invention in combination with a concave lens to interrupt and gather a secondary beam of light for further diffusion.

It is another object of the present invention to provide a light diffuser device consisting of a plurality of cells in each one of which there is disposed a concave lens for further diffusion of the light transmitted from each one of the plurality of cells.

It is another object of the present invention to provide a diffuser device consisting of a plurality of cells ganged together in a configuration for certain of the cells to be angled with respect to the remaining cells to intersect the diffused light being emitted from the device to reduce the glare of the resulting light beam.

It is another object of the present invention to provide a diffuser device consisting of a plurality of cells in each one of which is disposed a concave lens angled with respect to a longitudinal axis of the respective cell to effect diffusion of the light beam being emitted from the particular cell.

The foregoing objects are examples only of the objects and resulting advantages that are obtained from the diffuser device and method of the present invention.

The objects of the present invention are realized by providing a device and method for diffusing a light beam which consists of a truncated body having: a first truncated region at a first side of the truncated body for receiving light from the luminous body; a second truncated region at a second side of the truncated body substantially opposite to the first side and adapted for emitting light; and a central region interconnecting the first and second truncated regions and adapted for diffusing the light transmitted along the central region for providing a diffused pattern of light emitted from the second truncated region.

BRIEF DESCRIPTION OF THE DRAWINGS

For a more complete understanding of the present invention, reference may be had to the description of the preferred embodiments taken in conjunction with the accompanying drawings, of which.

DESCRIPTION OF THE PREFERRED EMBODIMENTS

Figure 1:
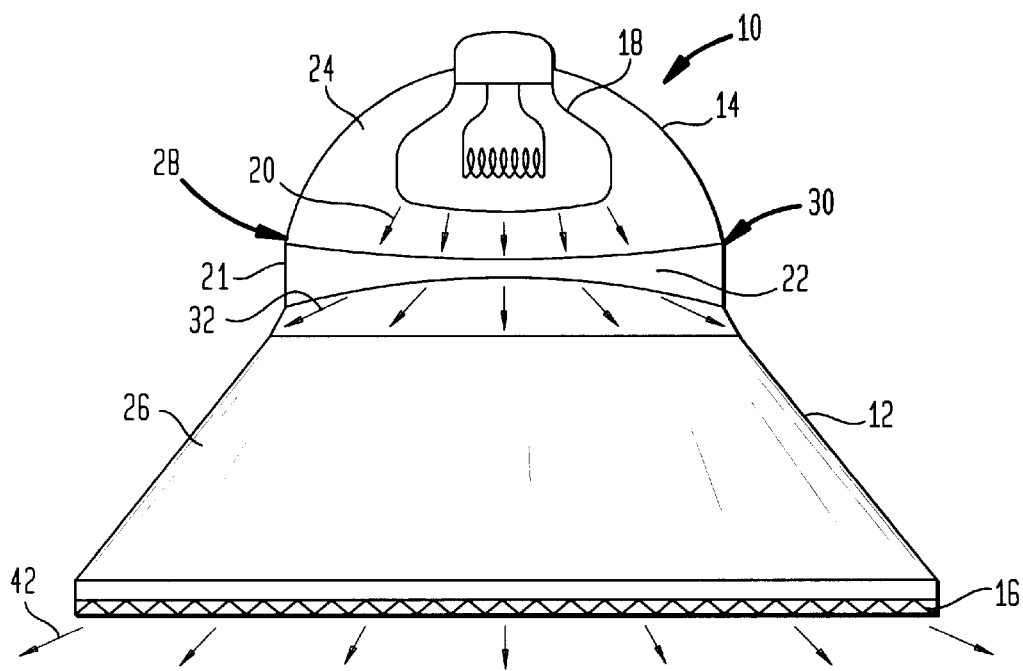
FIG. 1 is a view showing an embodiment of a light diffuser device of the present invention disposed in a light fixture assembly.

Referring to FIG. 1, a light beam diffusing headlamp assembly of the present invention is shown generally at 10. The assembly 10 includes a housing 12 having at one end a reflecting surface 14 or reflector, such as known in the art, and a lens cover 16 at an opposite end of the housing 12. A luminous body 18, such as a light bulb, extends through a rear wall portion of the housing 12 and the reflector 14 to coact with the reflector 14 to provide a primary light beam indicated generally by arrows 20.

A first diffuser means 22 constructed as a concave lens is disposed in the housing 12 between the reflector 14 and the lens cover 16. The construction and arrangement of the concave lens 22 is to divide an interior of the housing 12 into a primary chamber 24 and a secondary chamber 26 of the housing. In a preferred construction, the concave lens 22 is of a length sufficient to span the interior of the housing 12 such that opposed ends 28,30 of the concave lens 22 abut corresponding portions of the inner surface of the housing 12 to segregate the primary chamber 24 from the secondary chamber 26. In another preferred embodiment, a peripheral edge 21 of the lens 22 abuts continuously against an inner surface of the housing 12. In still another preferred embodiment, the reflector 14 is disposed in the housing 12 to extend completely along an inner surface of the housing in the primary chamber 24. The primary light beam 20 passes through the concave lens 22 to be diffused further into the secondary chamber 26 as a secondary light beam indicated generally by arrows 32.

Figure 2:
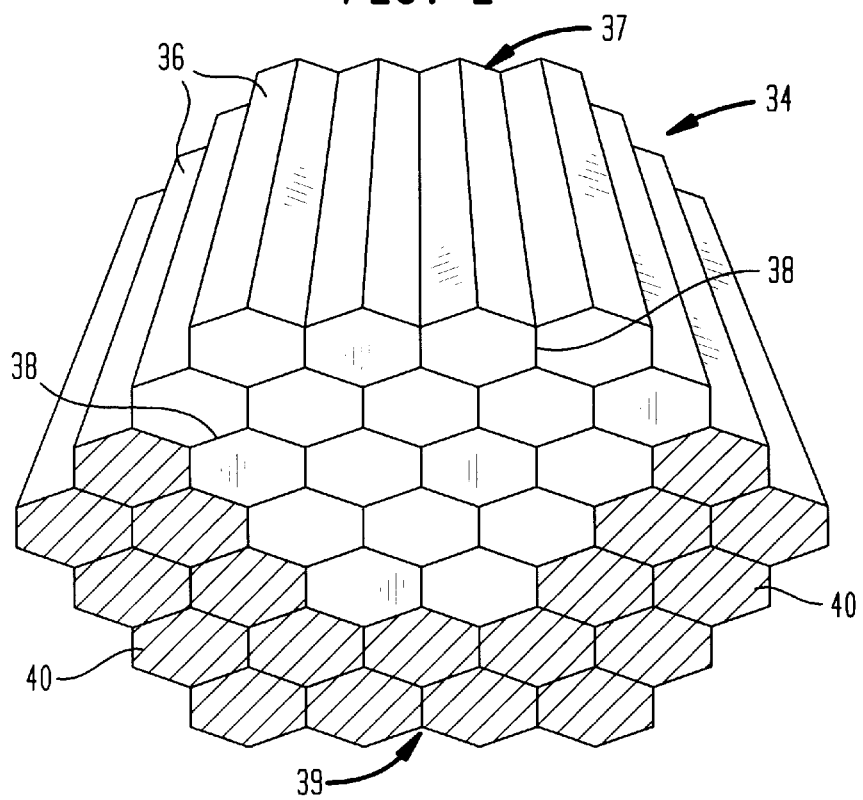
FIG. 2 is a perspective view of another embodiment of a light diffuser device according to the present invention for being disposed in the light fixture assembly of FIG. 1.

The secondary chamber 26 of the housing 12 is sized and shaped to receive a second light diffuser means 34, which is shown in FIG. 2.

Figure 3:
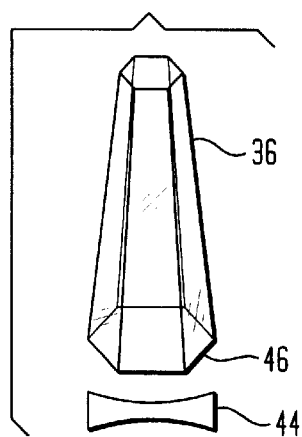
FIG. 3 is a perspective view of a single cell of the diffuser device shown in FIG. 2.

Referring to FIGS. 2 and 3, the light beam diffuser device 34 resembles a truncated body or mass, and is constructed from a plurality of truncated hollow receptacles 36 or cells, each one of which has a hexagonal-shaped cross-section. The cross-section of the plurality of receptacles 36 resembles a honeycomb. The receptacles 36 have a tapered diameter, shown more particularly in FIG. 2. That is, the widest portion of each one of the cells 36 faces the lens cover 16, with each one of the cells tapering to a reduced diameter as it extends toward the bulb 16 of the headlamp 10. The narrowest end of each one of the cells 36 collectively forms a light receiving region shown generally at 37. The widest end of each one of the cells 36 collectively forms a light transmitting region shown generally at 39.

The cells 36 are nested or ganged together along their respective sidewalls 38, as shown in FIG. 2, so that preferably, none of the secondary light 32 is permitted to pass between the abutting sidewalls of the respective cells 36. The ganged arrangement of a plurality of the individual cells 36 is constructed to have a cross-section resembling a honeycomb as well, such as shown in FIG. 2.

The truncated cells 36 can be manufactured of substantially any material, provided the material is heat resistant to the effects of light emitted from the bulb 18. The material to construct the cells 36 is preferably substantially opaque, but can be translucent.

The individual construction of each cell 36 and the ganged arrangement 34 of a plurality of the cells 36 is to provide a radiating honeycomb to diffuse the light rays 20,32.

The tapering effect of the cells 36 of the ganged arrangement shown in FIG. 2 results in a longitudinal axis along each one of the cells 36 tapering toward each other to a common origin. In another embodiment, certain cells 40 indicated with cross-hatching are at a slightly different angle than the remaining cells 36. This provides for still further dispersion of a headlamp beam indicated by arrows 42.

In FIG. 3, an individual cell 36 is shown having a concave lens 44 dispersed therein. The concave lens 44 is constructed to be disposed at a wider opening 46 of the cell 36. This provides for still further diffusion of the light emitted from each one of the individual cells 36.

Figure 4:
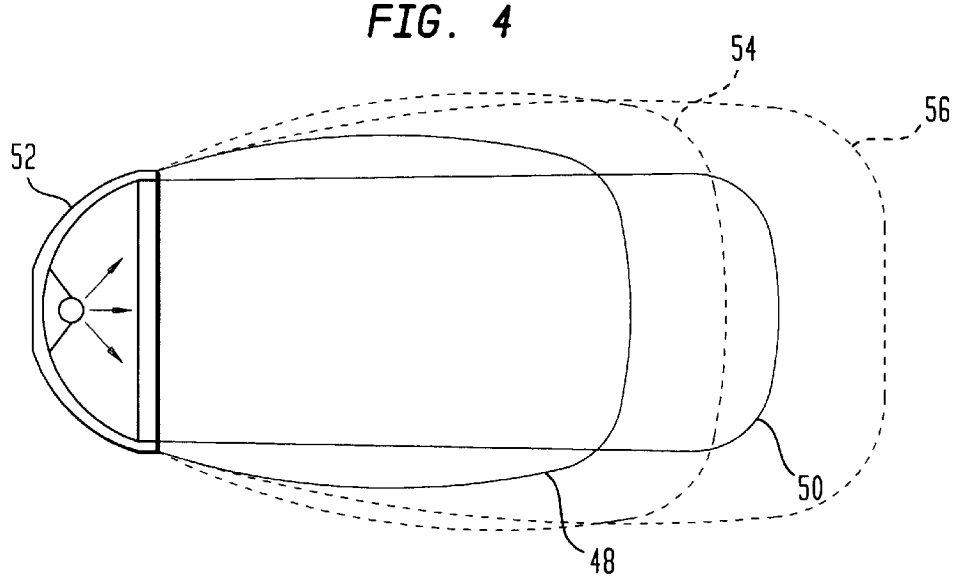
FIG. 4 is a top plan view showing diagrammatically the disposition and scope of high and low beams produced by the present invention, as compared to high and low beams produced by conventional headlight fixtures.
Figure 5:
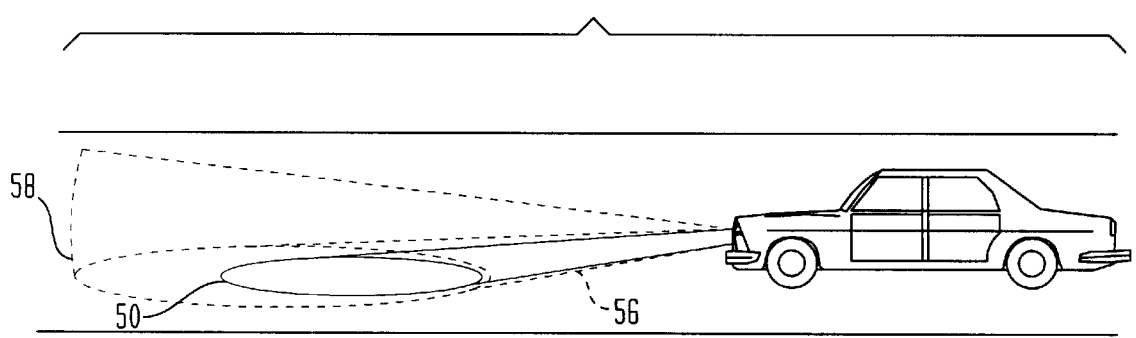
FIG. 5 is a side view of a motor vehicle showing diagrammatically the disposition and scope of the light beam produced according to the present invention, as compared to the light beam produced by conventional headlight fixtures.

FIGS. 4 and 5 show the result of employing the light diffusing device 10 having a plurality of the truncated cells 36 nested together.

In FIG. 4, solid lines 48,50 show low 48 and high 50 beam scope, respectively, for an automobile headlamp 52 employing conventional headlight construction. In contrast, broken lines 54,56 show the disposition and scope of a lighted area for low 54 and high 56 beams, respectively, that are obtained when the diffuser devices 22 and/or 34 of the present invention are employed.

In FIG. 5, the dispersion of the light beam 56 produced by the present invention provides for an extended field 58 of light projected further from the front of the vehicle than the conventional high beam 50. There is therefore less of a chance of an automobile driving beyond the reach of its headlamp beam. The device also increases the ability to read signage from a further distance as a result of the field 58.

Figure 6:
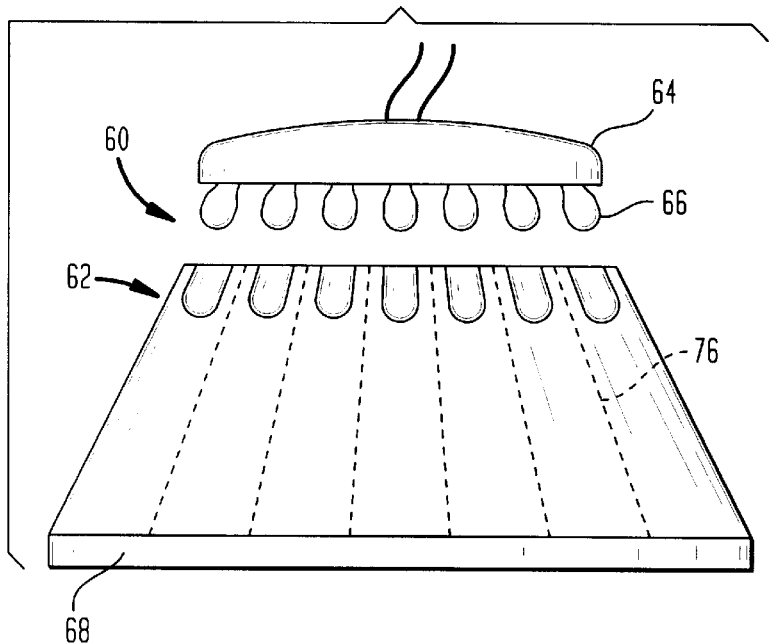
FIG. 6 is a view of another embodiment of a light fixture assembly for the present invention.
Figure 8:
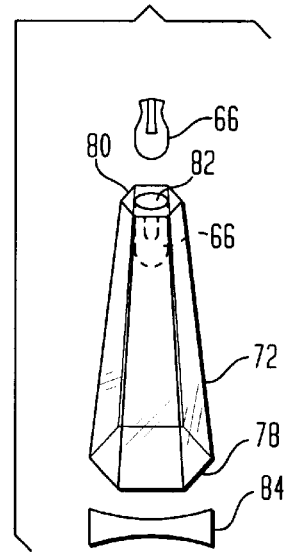
FIG. 8 is a perspective view of another embodiment of a single cell of the diffuser device shown in FIG. 7.
Figure 7:
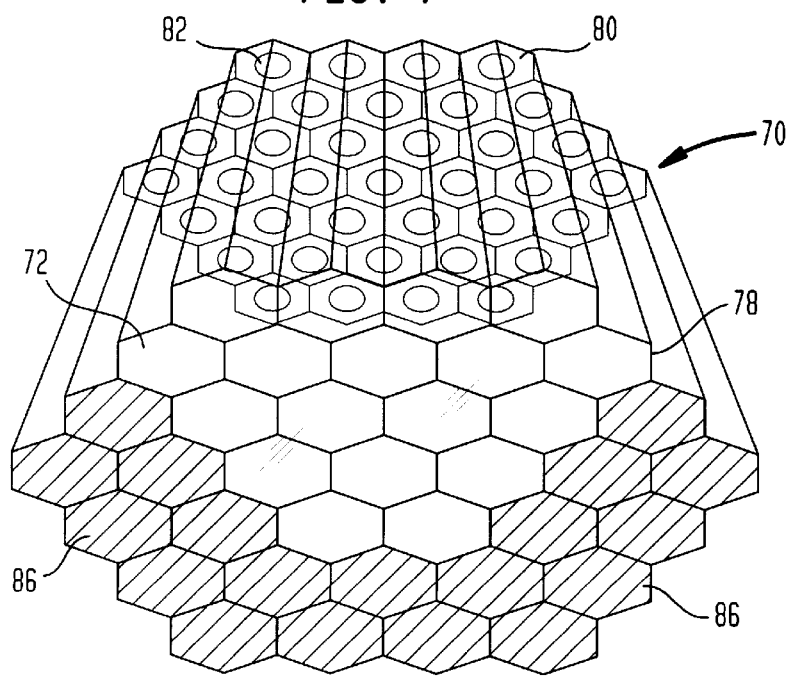
FIG. 7 is a perspective view of still another embodiment of a light diffuser device according to the present invention for being disposed in the light fixture assembly of FIG. 6.

The plurality of truncated cells 36 nested together in an array disperses the light and therefore, substantially reduces the glare experienced by oncoming drivers. In addition, the array of nested, truncated cells 36 permits the user to drive with both high and low beams, since the light beams are sufficiently diffused to substantially reduce the glare normally experienced by oncoming drivers. With this arrangement of cells 36, a bulb 18 having higher candela output can be employed without the associated excessive glare that occurs in conventional lamp structures. Another embodiment of the present invention is shown in FIGS. 6–8. The embodiment and elements thereof as shown in FIGS. 6–8 operate to provide a similar light diffusing result and attendant advantages, unless otherwise stated.

In FIG. 6, another embodiment of a light beam diffusing headlamp assembly in the present invention is shown generally at 60. The assembly 60 includes a housing 62 having a reflector 64 and a plurality of luminous bodies 66, i.e bulbs, which extend to an interior of the housing. The housing also includes a lens cover 68 mounted to the housing at an end opposite to the reflector 64. A concave lens (similar to lens 22) disposed in the housing can also be employed with this embodiment.

A plurality of light bulbs 66 are provided to each extend into the housing 62 to a corresponding cell of another embodiment of the light diffuser means shown generally at 70 in FIG. 7. The embodiment of FIG. 7 provides advantages similar to those discussed with reference to FIG. 5.

The light diffuser means 70 is constructed of a plurality of individual cells 72 which have a hexagonal-shaped cross-section, as that shown with respect to FIGS. 2 and 3. As shown in FIG. 7, the plurality of cells 72 are ganged together along their respective sidewalls 74 into a body or mass having a hexagonal-shaped cross-section. The light diffuser means 70 is sized and shaped to be disposed in the housing 62, with broken lines 76 of FIG. 6 representing generally the disposition of the diffuser means 70 in the housing 62.

Each one of the cells 72 from which the diffuser means 70 is composed, has a truncated shape with a wider opening 78 extending to an end wall 80, having a width less than a width of the opening 78. The end wall 80 of each one of the cells is provided with an aperture 82 which is constructed and arranged to receive a corresponding one of the bulbs 66. The coaction between an individual bulb 66 and a corresponding cell 72 is shown in FIG. 8.

The diffuser means 70 can also include a plurality of concave lenses 85 which are sized and shaped to be received at the wider opening 78 of each one of the cells 72. This construction provides for a further dispersing of the light rays transmitted through each one of the cells.

In FIG. 7, certain of the cells 72 are cross-hatched at 86. The cells 86 are arranged at a slightly different angle than the remaining cells 72 for providing a further diffusing effect similar to that discussed with respect to FIG. 2. The arrangement of these cells 72 at an angle slightly different with respect to the remaining cells provides for further diffusion of the light beam, thereby promoting the advantage that high beams as well as low beams can be used by the vehicle without exposing the oncoming driver to adverse glare effects.

The material from which the light diffuser device is constructed is similar to that discussed with respect to the embodiment in FIG. 2.

It will be understood that the embodiments described herein are merely exemplary and that a person skilled in the art may make many variations and modifications without departing from the spirit and scope of the invention. All such modifications and variations are intended to be covered by the appended claims.

What is claimed is:

1. A light fixture, comprising:
   a housing having:
      a front end,
      a back end opposite to the front end, and
      a sidewall interconnecting the front end and the back end for providing an interior space of the housing,
      an opening in the front end communicating with the interior space;
   a reflector disposed at the back end and facing the front end;
   a light source extending through the back end of the housing and the reflector to be operatively associated with the reflector at the interior space of the housing;
   a transparent cover extending across the opening at the front end of the housing;
   a concave lens disposed within the housing between the light source and the front end of the housing, the concave lens having:
      a peripheral edge for abutting against an inner surface of the housing,
      a receiving surface facing the light source, and
      a transmitting surface opposite to the receiving surface and facing the opening at the front end of the housing;
   a first region in the housing occupying an area between the reflector and the receiving surface of the concave lens and into which light from the light source is radiated to impact the receiving surface of the concave lens; and
   a second region in the housing occupying an area between the transmitting surface of the concave lens and the front end of the housing, the second region segregated into a plurality of channels into which light from the concave lens is radiated to provide a diffused pattern of dispersed light to exit the front end of the housing.

2. A light fixture, comprising:
   a housing having:
      a front end,
      a back end opposite to the front end, and
      a sidewall interconnecting the front end and the back end for providing an interior space of the housing,
      an opening in the front end communicating with the interior space;
   a reflector disposed at the back end and facing the front end;
   a light source extending through the back end of the housing and the reflector to be operatively associated with the reflector at the interior space of the housing;
   a transparent cover extending across the opening at the front end of the housing;

a truncated body disposed within the housing between the light source and the front end of the housing, the truncated body having:
   a plurality of hexaganolly-shaped hollow cells nested together along respective sidewalls of the cells,
   each one of the plurality of cells having a first end terminating at a receiving surface facing the light source, and
   a second end opposite to the first end and terminating in a transmitting surface facing the opening at the front of the housing,
   wherein a diameter of the receiving surface is less than a diameter of the transmitting surface of the truncated body;
a first region in the housing occupying an area between the reflector and the receiving surface of the truncated body and into which light from the light source is radiated to impact the receiving surface of the truncated body; and
a second region in the housing occupying an area between the transmitting surface of the truncated body and the front end of the housing and into which light from the truncated body is radiated in a diffused pattern to exit the front end of the housing.

3. A light fixture, comprising:
a housing having an interior region extending to an opening for the housing;
means for illuminating the housing operatively associated with the interior region of the housing; and
means for diffusing light emitted from the illuminating means, the diffusing means comprising:
   a body portion having:
      a first end for receiving light from the illuminating means,
      a second end opposite to the first end and facing the opening of the housing for radiating light to the opening, and
      a plurality of channels tapering outward toward the second end, and extending between the first end and the second end for diffusing light transmitted therethrouqh from the first end to the second end,
      wherein the light radiated from the second end is in the diffused pattern to exit the opening of the housing.

4. The light fixture according to claim 3, further comprising:
a reflector disposed at the interior region of the housing and in operative association with the illuminating means for reflecting light at the interior region toward the diffusing means.

5. The light fixture according to claim 3, further comprising:
a concave lens disposed between the illuminating means and the diffusing means.

6. The light fixture according to claim 5, further comprising:
a first region in the housing between the illuminating means and the diffusing means and into which light from the illuminating means is radiated to impact a first surface of the concave lens, and
a second region in the housing between a second surface of the concave lens opposite to the first surface and the opening for the housing and into which light from the concave lens is radiated in a diffused pattern to exit the opening at the front end of the housing.

7. The light fixture according to claim 3, wherein each one of the plurality of channels extends along a respective one of the hollow cells which are nested together along their respective sidewalls.

8. The light fixture according to claim 7, wherein each one of the plurality of cells has a hexagonal-shaped cross-section.

9. The light fixture according to claim 3, wherein a diameter of the first end of the body portion facing the illuminating means is less than a diameter of the second end of the body portion facing the opening of the housing.

10. The light fixture according to claim 3, wherein the diffusing means has a hexagonal-shaped cross-section.

11. The light fixture according to claim 7, wherein a diameter of each one of the cells increases from the respective first end through to the respective second end of the cell.

12. The light fixture according to claim 7, wherein each one of the plurality of cells includes a longitudinal axis which intersects longitudinal axes of the remaining cells beyond the receiving end of the body portion.

13. The light fixture according to claim 3, further comprising:
secondary means for diffusing light, the secondary diffusing means disposed between the diffusing means and the opening of the housing for further diffusion of light to exit from the housing.

14. The light fixture according to claim 7, wherein each one of the hollow cells includes:
a secondary diffusing means disposed at the second end of each one of the cells.

15. The light fixture according to claim 14, wherein the secondary diffusing means comprises:
a concave lens.

16. The light fixture according to claim 15, wherein select ones of the cells are angularly offset with respect to the remaining cells of the body portion for further diffusing light radiated from the body portion.

17. The light fixture according to claim 3, wherein the illuminating means comprises:
a plurality of bulbs constructed and arranged to extend into the interior region of the housing for insertion into a corresponding one of the plurality of the channels.

18. In a light fixture consisting of an open-ended housing, a reflector disposed at a first end of the housing away from the opening, and a light source disposed at an interior of the housing for operative association with the reflector, a diffuser device adapted to be disposed at the interior of the housing, the device comprising:
a plurality of truncated cells nested together, each one of the truncated cells including:
   a first end with a first opening having a first diameter for facing the light source,
   a second end with a second opening having a second diameter greater than the first diameter for facing the opening of the housing, and
   a hexagonally-shaped sidewall extending between the first and second ends of the truncated cell and tapering from the second end to the first end of the truncated cell,
wherein the construction and arrangement of the plurality of truncated cells provides the diffuser device with a hexagonal-shaped cross-section for light from the light source to be received at the first openings of the plurality of truncated cells and transmitted through the plurality of truncated cells in a diffused pattern for radiation from the second openings of the truncated cells to exit the housing.

19. A device for diffusing light from a luminous body, the device comprising:

a truncated body having:
    a first truncated region at a first side of the truncated body for receiving light from the luminous body;
    a second truncated region at a second side of the truncated body substantially opposite to the first side and adapted for emitting light; and
    a central region interconnecting the first and second truncated regions, the central region increasing in diameter from the first truncated region to the second truncated region and adapted for diffusing the light transmitted along the central region for providing a diffused pattern of light emitted from the second truncated region.

20. The diffuser device according to claim 19, wherein the first and second truncated regions and the central region each have a hexagonal-shaped cross-section.

21. The diffuser device according to claim 20, wherein the truncated body comprises:
    a plurality of hollow cells nested together, each one of the plurality of cells having:
        a first end terminating at the first truncated region, and
        a second end terminating at the second truncated region.

22. The device according to claim 21, wherein each one of the plurality of cells has a hexagonal-shaped cross-section.

23. The device according to claim 21, wherein the first end of each one of the plurality of cells has a first diameter and a second end of each one of the plurality of cells has a second diameter greater than the first diameter.

24. The device according to claim 21, wherein each of the cells comprises:
    an opening at the first end thereof, the openings constructed and arranged for receipt of an individual illuminating means.

25. The device according to claim 21, wherein select ones of the plurality of cells are angularly offset with respect to the remainder of the plurality of cells in the truncated body.

26. A method of diffusing light, comprising the steps of:
    providing a light source from which light radiates;
    containing the light radiated to a first region;
    interrupting the light with a concave lens in the first region;
    transmitting the light from the first region in a first diffused pattern through the concave lens;
    radiating the first diffused pattern of light emitted from the concave lens to a second region;
    containing the first diffused pattern of light emitted from the concave lens to the second region;
    interrupting the light with a truncated body in the second region;
    transmitting the light from the second region in a second diffused pattern through the truncated body;
    dispersing the diffused pattern of light in a widening ray; and
    radiating the second diffused pattern of light emitted from the truncated body.

27. A method of diffusing light, comprising the steps of:
    providing a light source from which light radiates;
    interrupting the light with a substantially transparent member;
    segregating a substantial portion of the light to a plurality of channels within the member;
    dispersing the light transmitted in a widening ray along the plurality of channels; and
    radiating a diffused pattern of light emitted from the plurality of channels.

* * * * *